W. S. HARLEY.
SIDE CAR FOR MOTOR CYCLES.
APPLICATION FILED AUG. 20, 1915.
1,212,350.
Patented Jan. 16, 1917.
4 SHEETS—SHEET 1.
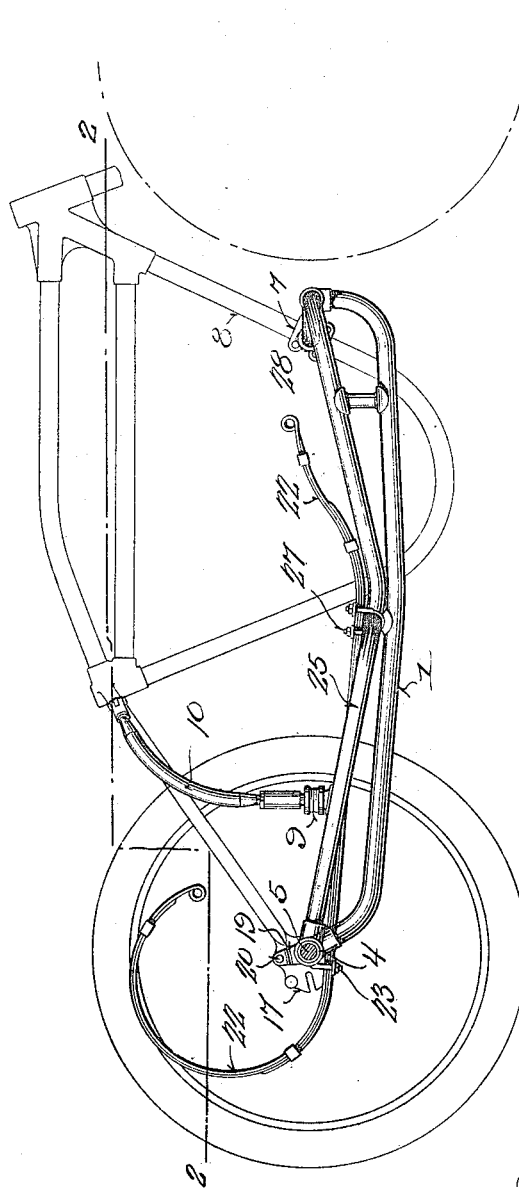

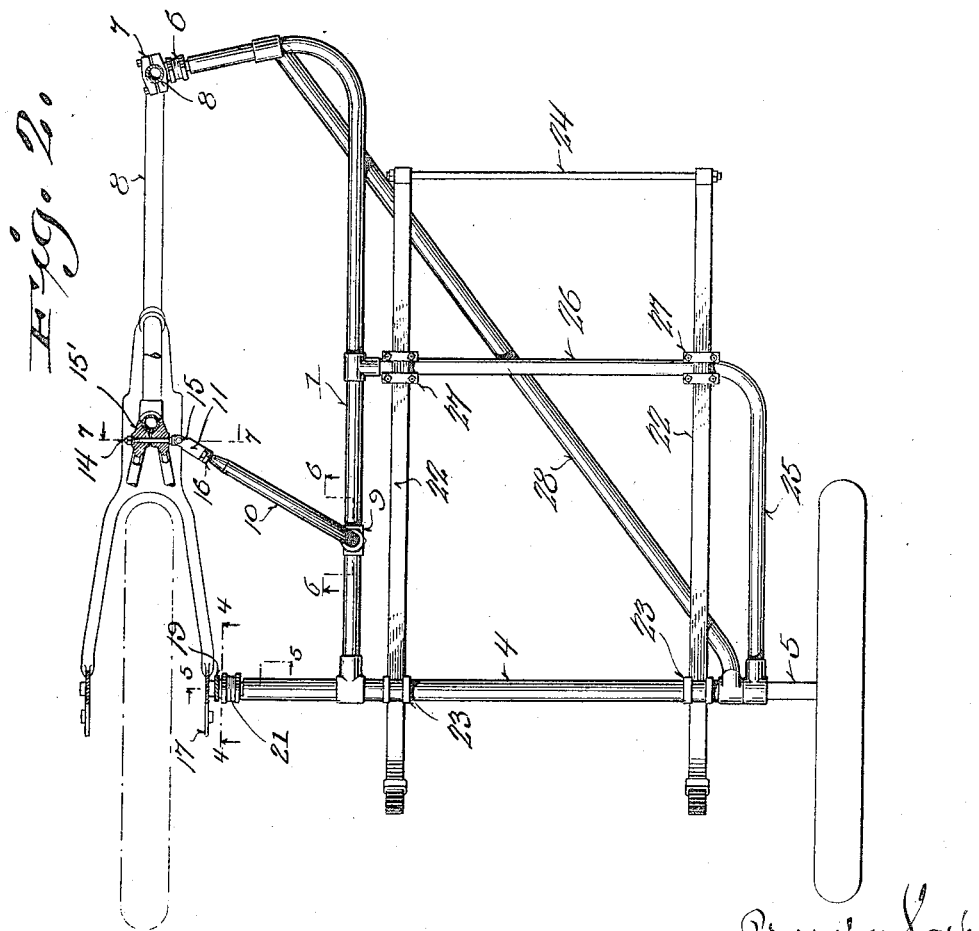

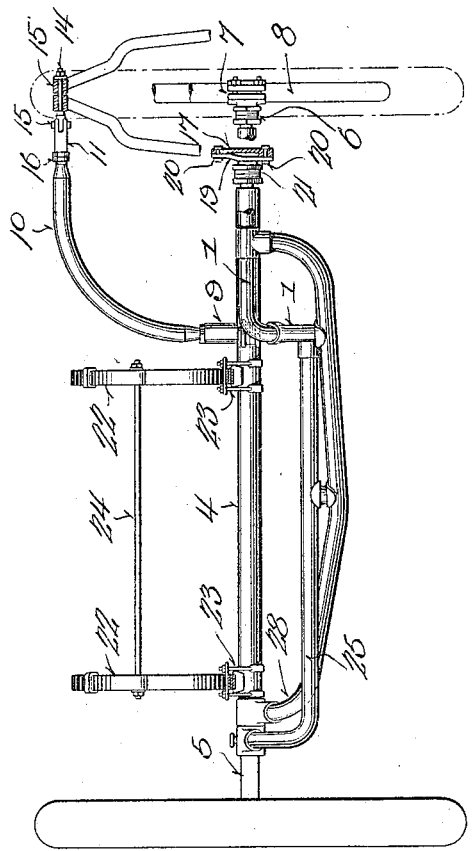

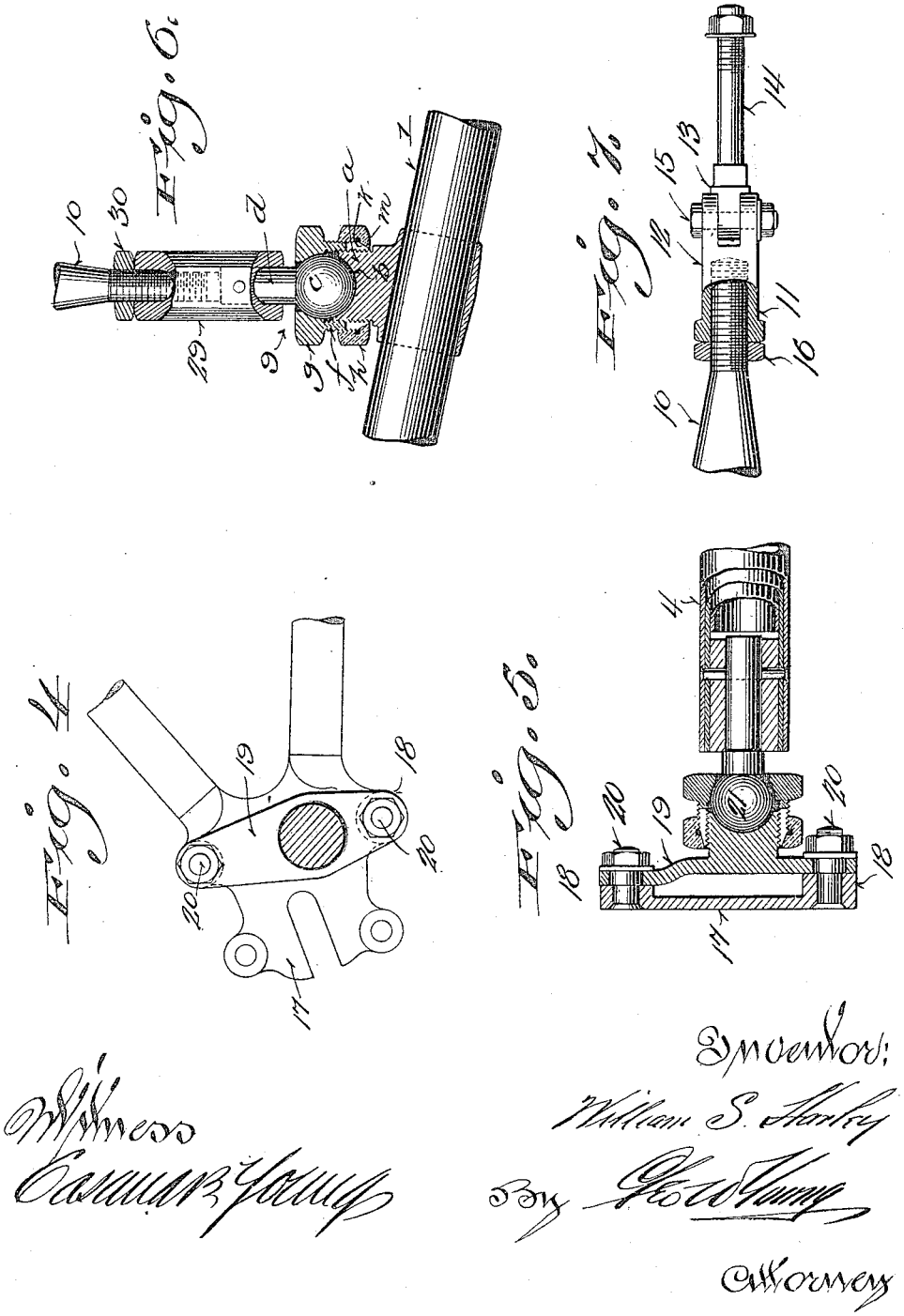

UNITED STATES PATENT OFFICE.

WILLIAM S. HARLEY, OF MILWAUKEE, WISCONSIN, ASSIGNOR TO HARLEY-DAVIDSON MOTOR CO., OF MILWAUKEE, WISCONSIN.

SIDE CAR FOR MOTOR-CYCLES.

1,212,350.  Specification of Letters Patent.  Patented Jan. 16, 1917.

Application filed August 20, 1915. Serial No. 46,554.

*To all whom it may concern:*

Be it known that I, WILLIAM S. HARLEY, a citizen of the United States, and resident of Milwaukee, in the county of Milwaukee and State of Wisconsin, have invented certain new and useful Improvements in Side Cars for Motor-Cycles; and I do hereby declare that the following is a full, clear, and exact description thereof.

This invention relates to the subject of motorcycles, and more particularly to a novel form of coupling by means of which a side car can be readily attached to or detached from a motorcycle.

The primary aim of the invention is to produce a coupling for side cars of motorcycles by means of which all strains or the like incidental to the starting of the motorcycle are so distributed that they are reduced to the minimum, and also to produce a coupling in which the shocks, jars, and other vibrations incidental to the movement of the motorcycle and car are not transmitted from one to the other.

In producing a coupling capable of performing the functions generally stated in the foregoing, it is contemplated providing a plurality of coupling members that are attachable to various parts of a motorcycle frame and making the points of connection in the form of universal joints so that the motorcycle and car may have vibratory movements independent of each other, and also to so distribute such points of connection that the starting movement of the motorcycle will be positively yet evenly communicated to the car and thereby prevent a jerky start of the car that is both disagreeable to the occupant of the car as well as a source of damage to the car and motorcycle.

One simple and practical embodiment of the invention is shown in the accompanying drawings, wherein—

Figure 1 is a view in longitudinal section taken substantially on the line 1—1 Fig. 2, showing the improved coupling attached to the frame of a motorcycle. Fig. 2 is a top plan view. Fig. 3 is a view in rear elevation. Fig. 4 is a detail sectional view taken on the line 4—4, Fig. 2. Fig. 5 is a detail sectional view taken on the line 5—5 Fig. 2. Fig. 6, is a detail view in section taken on the line 6—6, Fig. 2. Fig. 7 is a detail sectional view taken on the line 7—7, Fig. 2.

Referring to the accompanying drawings by numerals, it will be seen that my improved side car structure comprises in its general organization an inner side bar 1 having its rear end coupled to the casing 4 that incloses the axle 5 of the side car. The forward end of side bar 1 is curved laterally outwardly with respect to the side car and has a universal connection 6 with a clip 7 carried by the forward drop bar 8 of the motorcycle frame. Adjacent its rear end bar 1 has a universal connection 9 with one end of an arm 10. The other end of arm 10 is threaded for engaging the threaded sleeve 11 that has a bifurcated portion 12 hinged to the head 13 of a bolt 14 by means of the pin 15, the bolt 14 extending through the upper end of the saddle post 15′ of the motorcycle frame. A jam nut 16 is used for locking the threaded end of arm 10 to sleeve 11. The rear fork 17 of the motorcycle frame adjacent the side car, is provided with upper and lower ears 18 and a plate 19 is connected to said ears by the bolts and nuts 20. Plate 19 has a universal connection 21 with axle casing 4.

The body supporting springs 22 of the side car have their rear portions connected to the axle casing 4 by the clips 23, the forward ends of said springs being connected by a rod 24. An outer side bar 25 has its rear end coupled to the casing 4 beyond the springs 22, said bar projecting forwardly and terminating in an inwardly projecting arm 26 that extends transversely across the springs 22 and has clip connections 27 with said springs, the inner end of said arm being coupled to the bar 1 at approximately the longitudinal center of said bar 1. A diagonally extending brace bar 28 has its rear end coupled to the axle casing 4 between the spring 22 and the bar 25, the brace bar extending beneath the springs 22, arm 26 and bar 1 and being coupled to the angularly projecting portion of said bar 1 at an intermediate point.

Referring to Figs. 1 and 3 of the drawings in connection with Fig. 6, it will be observed that the arm 10 is upwardly and outwardly curved and that at its universal joint 9 with bar 1, the said arm is threaded for engagement with an adjusting sleeve 29 and a locknut 30. Through the medium of said sleeve 29 and its connection with the universal joint 9, and the connection of the other end of the arm 10 with bolt 14 of the motorcycle frame, it will be seen that adjustments of the motorcycle relative to the side car can be readily obtained, such adjustments being facilitated through the rear universal connection 21 and the front universal connection 6 upon which the entire coupling swings. The described adjustable connection is of great value in side car motorcycles in that it facilitates the necessary vertical positioning of the motorcycle relatively to the side car.

The specific type of universal joint that is preferred to be used in connection with this invention is shown in detail in Figs. 5 and 6 of the accompanying drawings, although it is to be understood that under certain conditions the same may be varied. Fig. 6 of the drawings shows in detail the preferred type of universal joint, and by referring to said figure it will be observed that the same consists of a threaded boss $a$ provided with a semi-spherical socket $b$ forming a seat for the ball $c$. The ball $c$ has a shank $d$ for attachment to the coupling and the boss $a$ is carried by or attached to the motorcycle frame. The externally and internally threaded sleeve $f$ of the socketed nut $g$ engages the threads of the boss $a$ and retains the ball to its seat. The sleeve $f$ of the nut $g$ is split and has a cam end $k$. A jam nut $h$ externally engages the split sleeve and has a cam portion $m$ that binds on the cam portion of the nut $g$ to lock said sleeve in the desired adjusted position on the boss $a$.

From the foregoing it will be understood that the bar 1, axle casing 4, and bars 25 and 28 form a rigid frame the members of which are firmly connected, and that said frame is pivotally connected to the motorcycle frame through the connections 21, 9 and 6, such connections being respectively, the rear, intermediate, and front connections, and further that through the described connection of the arm 10 with the side bar 1 and the motorcycle frame, the necessary relative adjustments of the motorcycle and car may be readily made.

It is noted that the ends of the bars 1 and 4 which carry the universal connections 6 and 21 respectively extend a considerable distance laterally of the side car frame and by reason of said universal connections these extended bar ends are utilized to give a considerable flexure to the attachment of the side car to the motor-cycle, and permit independent shock compensating vibrations of the side car and motor-cycle, it being appreciated that such vibrations would be comparatively slight, yet of such nature as to prevent the jerky starting of the car, in contradistinction to previously existing arrangements wherein the side of the side car frame is attached directly to the motor-cycle or in a manner preventing a horizontal pivotal movement at said connections.

It is further noted that the point of attachment of the intermediate bar 10 to the side car frame is inwardly of the pivotal connections 6 and 21 and thus the said bar 10 resists pivotal movement of the side car frame, such movement being permitted however, to a limited extent by flexure of the intermediate bent bar 10 and of the main bar 1 of the side car frame, and by the universal connection 9 which also permits horizontal, vibratory movement of the frame by flexure of the downwardly directed end of the intermediate bar 10.

What I claim as my invention is:—

1. A motor-cycle side car including a frame formed of an inner side bar having its forward end bent outward and adapted for attachment to a motor-cycle frame, an axle member having a rigid connection with the rear end of said bar and adapted at one end for attachment to a motor-cycle frame, an outer side bar having an angular arm rigidly connected to the inner side bar at an intermediate point, the outer bar having its rear end rigidly fastened to the axle member and a diagonal bar connecting the outer portion of the axle member with the said outwardly bent forward end of the inner side bar.

2. In combination with a motor-cycle frame, a side car therefor having laterally directed frame extensions at the front and rear portions of one side, said extensions being of considerable length whereby to provide for vibratory cushioning movement, means for universally connecting said extensions with the frame of the motor-cycle and means connecting the side car with the motor-cycle to limit relative vertical pivotal movement thereof.

3. In combination with a motor-cycle frame, a side car therefor having laterally directed frame extensions at the front and rear portions of one side, said extensions being of considerable length whereby to provide for vibratory cushioning movement, means for universally connecting said extensions with the frame of the motor-cycle, and an arm extending from the motor-cycle and universally and adjustably connected with the intermediate portion of the car at a point inwardly of the pivotal connections of the said frame extensions.

4. In combination with a motor-cycle frame, a side car therefor having laterally directed frame extensions at the front and rear portions of one side, said extensions being of considerable length whereby to provide for vibratory cushioning movement, means for universally connecting said extensions with the frame of the motor-cycle, an arm projecting laterally from the motorcycle above the side car and having its free end downwardly directed and pivotally connected with the side car.

5. In combination with a motor-cycle frame, a side car therefor having laterally directed frame extensions at the front and rear portions of one side, said extensions being of considerable length whereby to provide for vibratory cushioning movement, means for universally connecting said extensions with the frame of the motor-cycle, an arm pivoted to the motor-cycle above the side car frame and extending laterally from the motor-cycle, and the free end of the bar being downwardly directed and universally connected with the side car.

6. In combination with a motor-cycle frame, a side car therefor having a frame formed of an inner side bar having its forward end bent outward, an axle member having a rigid connection with the rear end of the said bar, an outer side bar having an angular arm rigidly connected to the inner side bar at an intermediate point, the outer bar having its rear end rigidly fastened to the axle member, a diagonal bar connecting the outer portion of the axle member with the angular end of the inner side bar, means for universally connecting the angular end of the inner bar to the motorcycle frame, means for universally connecting the axle member to the motorcycle frame, and an arm universally and adjustably connecting the intermediate portion of the inner bar with an intermediate portion of the motorcycle frame.

In testimony that I claim the foregoing I have hereunto set my hand at Milwaukee, in the county of Milwaukee and State of Wisconsin, in the presence of two witnesses.

WILLIAM S. HARLEY.

Witnesses:
E. J. MUELLER,
EDWIN F. CASPER.

Copies of this patent may be obtained for five cents each, by addressing the "Commissioner of Patents. Washington, D. C."